Nov. 6, 1962

S. WOODS 3,062,231

CARBURETOR FLOAT VALVE

Filed Sept. 27, 1960

STEPHEN WOODS
INVENTOR.

BY J. R. Faulkner
T. H. Oster

ATTORNEYS 3,062,231
CARBURETOR FLOAT VALVE
Stephen Woods, Detroit, Mich., assignor to Ford Motor Company, Dearborn, Mich., a corporation of Delaware
Filed Sept. 27, 1960, Ser. No. 58,674
5 Claims. (Cl. 137—423)

This invention is concerned with carburetors and more specifically with novel float means for maintaining a stable fuel supply level in a carburetor float chamber.

A float control is necessary to maintain a predetermined fuel supply level in the carburetor. Forces acting upon the fuel in the float chamber traceable to uphill and downhill travelling, cornering, jack rabbit starting and spike stopping, among other things, result in fuel surges in the float chamber or bowl. Severe surges cause the float to drop and open the fuel inlet needle valve thereby permitting the fuel pump to pump more fuel through the fuel inlet needle valve into the float chamber. If a multiple float is used, the float unsupported by the buoyant force of the fuel will operate as a weight on the supported float thereby lowering the supported float to admit more fuel into the float chamber.

This additional fuel may unduly enrich the fuel to air ratio. As a result, engine performance is affected deleteriously and excessive fuel consumption is the rule.

Industry has been long cognizant of this problem and attempts have been made to solve it in various and sundry ways. Typical of the endeavors of the prior art to solve this problem are U.S. Letters Patent 2,655,359 issued October 13, 1953 to A. H. Winkler and U.S. Letters Patent 2,818,879 issued January 7, 1958 to J. T. W. Moseley, et al. After considerable testing, the structure of the instant invention has been found to be highly satisfactory.

The precise solution proposed by the inventor can best be understood by a study of the drawings in which.

Figure 1:
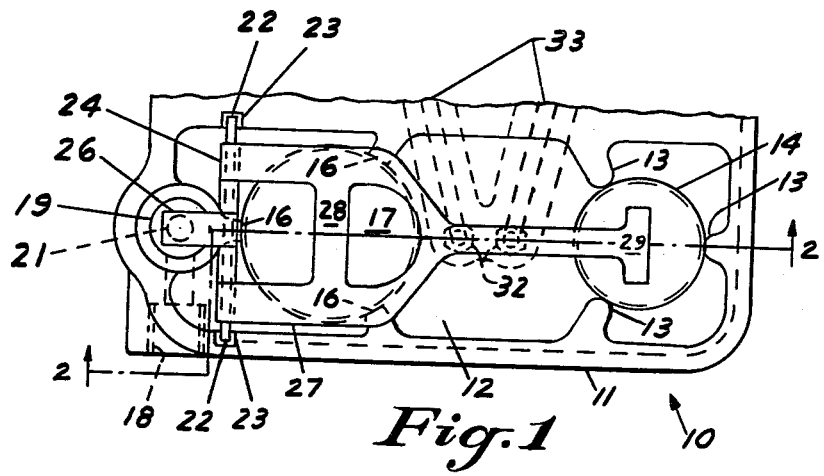
FIGURE 1 is a plan view of a portion of a carburetor float chamber in which the float chamber cover has been removed.
Figure 2:
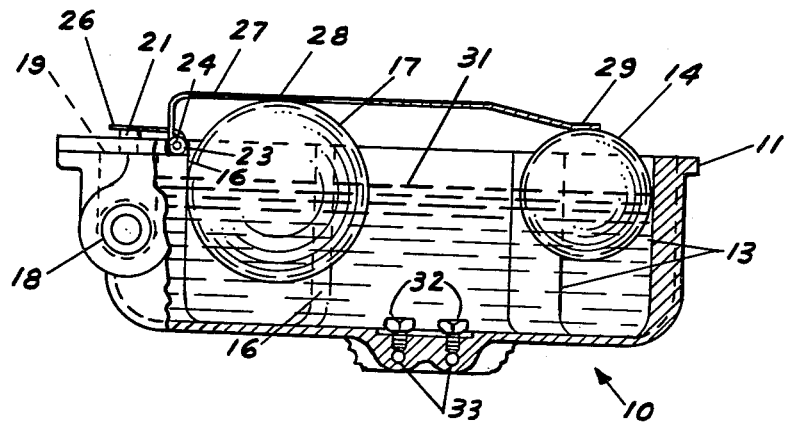
FIGURE 2 is a cross section taken on the plane indicated by the line 2—2 of FIGURE 1.

A portion of the carburetor float chamber is indicated generally at 10 and comprises the usual housing 11 that defines a float chamber 12. At one end of the float chamber 12 are vertical projections 13 integral with the housing 11. These projections 13 define a restricted vertical path in the float chamber 12 for ball float 14. As can be seen in FIGURE 1, ball float 14 is restricted in its lateral movement by the projections 13 but is unrestricted in its vertical movement except for rolling friction resulting from point contacts with the projections 13.

At the opposite end of the float chamber 12 are additional vertical projections 16 that are also integral with the housing 11 and likewise provide a vertical path for a larger ball float 17.

Incoming fuel from the fuel pump (not shown) is pumped through the fuel inlet 18 in the housing 11 and through an internal passage (not shown) to the fuel inlet needle valve seat 19. A fuel inlet needle valve 21 cooperates with the fuel inlet needle valve seat 19 to control the amount of fuel entering the float chamber 12. This construction is conventional.

The positioning of the fuel inlet needle valve 21 with respect to the fuel inlet needle valve seat 19 is accomplished through a float lever 27. Float lever 27 is pivotally mounted at 24 to shaft 22 that rests on its terminal ends in notches 23 provided in the sides of the housing 11. A tab 26 integral with the float lever 27 extends from the pivot 24 to overlay and contact the fuel inlet needle valve. Float lever 27 extends in an upward direction and then in a direction opposite to the tab 26 from the pivot 24 to overlay and contact by sections 28 and 29 ball floats 17 and 14 respectively.

Ball floats 14 and 17 are of different displacements. They may be made from metal, plastic or any other material which is unaffected by fuels. Ball float 14 exerts a smaller upward force but has a longer lever arm, whereas ball float 17 exerts a greater upward force but has a shorter lever arm. The moment of the force exerted by ball float 14 is the same as the moment of the force exerted by ball float 17. It is also possible to vary the upward moment of force, that is; have a moment of force greater with one of the floats than the other of the floats without losing control over the inlet needle valve operation. Either one of the ball floats can support the lever arm 27 so that the fuel level 31 will remain constant.

When the engine is in operation, fuel from float chamber 12 is moved by atmospheric pressure to pass through jets 32 through passageways 33 into the carburetor fuel system in the conventional manner.

If fuel surge takes place, contact between one of the ball floats 14 or 17 with its respective portions 29 and 28 of the float lever is discontinued by virtue of loss of sufficient fuel to keep the float in suspension and in contact with its respective float lever section. The ball float consequently falls away from the float lever contact without adding to the weight which the other floating ball float must carry. Hence, the fuel level is not affected. By having ball floats of different displacements, the ball floats are less susceptible to float vibrations thereby preventing fuel level creeping and carburetor flooding during speeds when engine roughness is severe.

Figure 3:
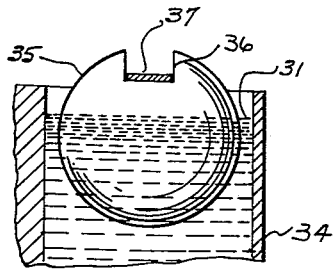
FIGURE 3 is a fragmentary transverse section taken through the carburetor float chamber and showing an alternate construction.

In FIGURE 3 it is possible to eliminate the point contact of the projections with the float. For example, in FIGURE 3 a cross section of the housing 34 is shown in which a float 35 is located. Float 35 is provided with a recess 36 in which a float lever portion 37 is positioned.

The novel float system is adaptable to many variations such as different vertical projection configurations which may also differ in number and placement, ball float configurations, ball float size, displacements, and material.

It will be understood, therefore, that the invention is not to be limited to the exact construction shown and described but that various changes and modifications may be made without departing from the spirit and scope of the appended claims.

I claim:

1. A carburetor comprising a housing defining a float chamber, a fuel inlet needle valve positioned in said housing to control the passage of fuel into the float chamber, float lever means pivotally mounted upon the housing, said float lever means having a tab overlaying and in contact with the fuel inlet needle valve on one side of the pivot mounting and a portion on the opposite side of the pivot mounting to the tab overlaying the float chamber, a pair of spaced apart floats underlaying said portion and detached from said portion but in contact therewith when supported by a column of fuel, said floats at different distances from the pivot axis of said pivotally mounted float lever means, means restricting the movement of said floats to a vertical direction, said floats having a combined upward moment of force when supported by a column of fuel in excess of the moment of force required to close the fuel inlet needle valve.

2. A carburetor comprising a housing defining a float chamber, a fuel inlet needle valve positioned in said housing to control the passage of fuel into the float chamber, float lever means pivotally mounted upon the housing, said float lever means having a tab portion overlaying and in contact with the fuel inlet needle valve on one side of the pivot mounting and an additional portion on the opposite side of the pivot mounting to the tab portion overlaying the float chamber, a pair of spaced apart floats underlaying and detached from said additional portion but in contact therewith when supported by a column of fuel, said floats at different distances from the pivot axis of said pivotally mounted float lever means, means restricting the movement of said floats to a vertical direction, said floats each exerting a different upward moment force and having a combined upward moment of force when supported by a column of fuel in excess of the moment of force required to close the fuel inlet needle valve.

3. A carburetor comprising a housing defining a float chamber, a fuel inlet needle valve positioned to control the passage of fuel into the float chamber, float lever means pivotally mounted upon the housing, said float lever means having a portion in contact with the fuel inlet needle valve on one side of the pivot mounting and an additional portion on the opposite side of the pivot mounting overlaying the float chamber, a pair of spaced apart floats underlaying and detached from said second mentioned portion but in contact therewith when supported by a column of fuel, said floats at different distances from the pivot axis of said pivotally mounted float lever means, each of said floats exerting a moment of force sufficient to close the fuel inlet needle valve when supported by a column of fuel, and means on said housing restricting the movement of said floats to a vertical direction.

4. A carburetor comprising a housing defining a float chamber, a fuel inlet needle valve positioned in said housing to control the passage of fuel into the float chamber, float lever means pivotally mounted upon the housing, said float lever means having a tab portion overlaying and in contact with the fuel inlet needle valve on one side of the pivot mounting and an additional portion on the opposite side of the pivot mounting to the tab overlaying the float chamber, a pair of spaced apart floats underlaying and detached from said second mentioned portion but in contact therewith when supported by a column of fuel, each of said floats being disposed at different distances from the pivot axis of said pivotally mounted float lever means, each of said floats having different displacements, means restricting the movement of said floats to a vertical direction, each of said floats exerting the same upward moment of force when supported by a column of fuel, each of said floats exerting an upward moment of force sufficient to close the fuel inlet needle valve.

5. A carburetor comprising a housing defining a float chamber, a fuel inlet needle valve positioned in said housing to control the passage of fuel into the float chamber, float lever means pivotally mounted upon the housing, said float lever means having a tab overlaying and in contact with the fuel inlet needle valve on one side of the pivot mounting and a section on the opposite side of the pivot mounting to the tab overlaying the float chamber, a pair of spaced apart floats underlaying and detached from said section but in contact therewith when supported by a column of fuel, said floats at different distances from the pivot axis of said pivotally mounted float lever means, said housing having projection means restricting the movement of said floats to a vertical direction, said floats having a combined upward moment of force when supported by a column of fuel in excess of the upward moment of force required to close the fuel inlet needle valve.

References Cited in the file of this patent

UNITED STATES PATENTS

| | | |
|---|---|---|
| 1,758,068 | Winfield | May 13, 1930 |
| 1,802,135 | Carter | Apr. 21, 1931 |
| 2,461,274 | Heintz | Feb. 8, 1949 |
| 2,600,366 | Sloane | June 10, 1952 |
| 2,655,359 | Winkler | Oct. 13, 1953 |
| 2,717,771 | Richardson | Sept. 13, 1955 |
| 2,818,879 | Moseley | Jan. 7, 1958 |

FOREIGN PATENTS

| | | |
|---|---|---|
| 514,398 | Belgium | Oct. 15, 1952 |
| 640,283 | Germany | Apr. 25, 1935 |
| 760,538 | Germany | Dec. 15, 1952 |
| 895,283 | France | Mar. 27, 1944 |